US012769755B2

(12) United States Patent
Mukherjee et al.

(10) Patent No.: US 12,769,755 B2
(45) Date of Patent: Oct. 20, 2026

(54) SYSTEMS AND METHODS FOR CREATING GENERATIVE AI FRAMEWORKS ON NETWORK STATE TELEMETRY

(71) Applicant: Aviz Networks, Inc., San Jose, CA (US)

(72) Inventors: Niloy Mukherjee, San Jose, CA (US); Chidambaram Bhagavathiperumal, Livermore, CA (US); Vishal Shukla, San Jose, CA (US); Rishab Arun Haltore, Washington, DC (US); Saksham Jain, Madison, WI (US)

(73) Assignee: Aviz Networks, Inc., San Jose, CA (US)

( * ) Notice: Subject to any disclaimer, the term of this patent is extended or adjusted under 35 U.S.C. 154(b) by 0 days.

(21) Appl. No.: 18/504,991

(22) Filed: Nov. 8, 2023

(65) Prior Publication Data

US 2025/0147976 A1 May 8, 2025

(51) Int. Cl.
*G06F 16/25* (2019.01)

(52) U.S. Cl.
CPC .................................. *G06F 16/254* (2019.01)

(58) Field of Classification Search
USPC .......................................................... 707/602
See application file for complete search history.

(56) References Cited

U.S. PATENT DOCUMENTS 5,854,628 A * 12/1998 Nakagawa ............... G09G 5/14
345/545
6,809,733 B2 * 10/2004 Mukherjee ............... G09G 5/12
712/31
10,789,195 B1 * 9/2020 Jha .......................... G06F 13/42
10,983,963 B1 * 4/2021 Venkatasubramanian ...................
G06F 16/1824
11,323,305 B1 5/2022 Liu
11,369,297 B2 * 6/2022 Wu ...................... G06V 10/454
(Continued)

FOREIGN PATENT DOCUMENTS

CN 115037621 A 9/2022

*Primary Examiner* — Sherief Badawi
*Assistant Examiner* — Jessica N Le
(74) *Attorney, Agent, or Firm* — Select IP Law Corporation; Ashkon Cyrus

(57) ABSTRACT

In some implementations, the device may include initiating a stream producer that sends formatted data to a topic. In addition, the device may include ingesting, by a sink connector, the formatted data into an object storage service. The device may include implementing an event-driven serverless compute, where the event-driven serverless compute is triggered automatically when any new data is ingested to the object storage service, and where the event-driven serverless compute reads the JSON data, converts it to transformed data, and writes the transformed data to a distributed data store. Moreover, the device may include creating an ETL job, where the ETL job reads the data, further transforms the data, and writes it back into the distributed data store as ETL transformed data. Also, the device may include sending the ETL transformed data to an LLM API in batches to create inference results, where the batches are queued to manage the rate limits. Further, the device may include storing the inference results in cache storage. In addition, the device may include implementing an API gateway for secure access to inference results.

14 Claims, 5 Drawing Sheets

300

(56) References Cited

U.S. PATENT DOCUMENTS

| | | | | |
|---|---|---|---|---|
| 11,405,261 | B1 | 8/2022 | Myla | |
| 12,033,006 | B1 * | 7/2024 | Nair | G06N 20/00 |
| 12,038,916 | B1 * | 7/2024 | Sutrave | G06F 16/2428 |
| 12,147,923 | B2 * | 11/2024 | Slavin | G06Q 10/06316 |
| 12,251,242 | B1 * | 3/2025 | Vakili | A61B 5/0004 |
| 2003/0195862 | A1 * | 10/2003 | Harrell, Jr. | G06F 16/252 |
| 2007/0174429 | A1 | 7/2007 | Mazzaferri | |
| 2009/0245500 | A1 * | 10/2009 | Wampler | H04M 7/006 379/265.09 |
| 2013/0050253 | A1 * | 2/2013 | Jooste | G06F 16/9577 345/629 |
| 2018/0069903 | A1 * | 3/2018 | Levy | H04L 65/1066 |
| 2018/0121529 | A1 | 5/2018 | Asadi | |
| 2018/0150528 | A1 * | 5/2018 | Shah | G06F 16/254 |
| 2018/0150529 | A1 * | 5/2018 | McPherson | G06F 9/542 |
| 2019/0081990 | A1 * | 3/2019 | Roy | H04L 9/0891 |
| 2019/0213099 | A1 | 7/2019 | Schmidt | |
| 2020/0026575 | A1 * | 1/2020 | Guim Bernat | G06F 9/4881 |
| 2020/0026710 | A1 * | 1/2020 | Przada | G06F 16/254 |
| 2020/0334274 | A1 * | 10/2020 | Joshi | G06F 40/106 |
| 2021/0117544 | A1 * | 4/2021 | Kurtz | G06F 21/566 |
| 2021/0258927 | A1 * | 8/2021 | Gupta | H04B 7/15542 |
| 2021/0334186 | A1 | 10/2021 | Chen | |
| 2021/0365304 | A1 * | 11/2021 | Khan | G06N 3/04 |
| 2022/0188360 | A1 * | 6/2022 | Rawat | G06F 16/90332 |
| 2022/0300351 | A1 * | 9/2022 | Phelan | G06F 9/5072 |
| 2022/0342692 | A1 | 10/2022 | Tsai | |
| 2022/0375467 | A1 * | 11/2022 | Jin | G06F 16/3329 |
| 2022/0414113 | A1 * | 12/2022 | Xing | G06F 11/3414 |
| 2023/0055940 | A1 * | 2/2023 | Dasari | G06F 16/254 |
| 2023/0196134 | A1 * | 6/2023 | Wang | G06N 3/044 706/25 |
| 2023/0269272 | A1 * | 8/2023 | Dambrot | H04L 63/1408 726/22 |
| 2024/0220486 | A1 * | 7/2024 | Sutrave | G06F 3/0483 |
| 2024/0232199 | A1 * | 7/2024 | Hambardzumyan | G06F 16/2455 |
| 2024/0370764 | A1 * | 11/2024 | Goyal | G06N 3/045 |
| 2025/0045256 | A1 * | 2/2025 | Gottlob | G06F 16/215 |

* cited by examiner

SYSTEMS AND METHODS FOR CREATING GENERATIVE AI FRAMEWORKS ON NETWORK STATE TELEMETRY

BACKGROUND

Network telemetry data, characterized by its enormous volume and high velocity, is generated in massive amounts by contemporary network management systems. These systems capture essential parameters, including bandwidth utilization, port status, device health, and network latency.

Traditional analytic approaches are inadequate to assimilate and process the scope of network telemetry data in an efficient manner. This limitation impedes network operators' ability to promptly discern patterns, anomalies, and potential issues that are critical for ensuring optimal network performance and security.

Thus, a pressing need exists for enhanced analytic methodologies capable of not only managing the network telemetry data but also effectively interpreting it. These improved methods are pivotal for augmenting network management systems, empowering them with proactive issue detection capabilities, refined traffic optimization, strategic capacity planning, and adept security incident identification. Such advancements can serve to improve the workflows of network management in preparation for an ever-growing volume of network telemetry data.

SUMMARY

The present disclosure provides a generative AI architecture that leverages the power of Large Language Models (LLMs) and the scalable infrastructure of the cloud native ecosystem to effectively process, analyze, and derive insights from long-term network telemetry data. Embodiments of the present disclosure provide systems and methods for creating generative AI frameworks on network state telemetry. The embodiments disclosed herein provide processes that increase the efficiency of a cloud native ecosystem to effectively process, analyze, and derive insights from long-term network telemetry data. It can be appreciated that embodiments of the present disclosure, by storing and analyzing data over a longer period and implementing the novel processing steps disclosed herein, can rapidly identify trends, patterns, and anomalies that might not be identifiable using conventional systems in the art in such a timely and efficient manner. The embodiments disclosed herein allow for more informed decision-making and proactive network management in the context of network telemetry.

Some implementations herein pertain to a method. For instance, the method may involve initiating a data streaming producer responsible for transmitting structured information to a designated destination. For example, the data producer can be Kafka, a distributed, high-throughput, and fault-tolerant stream processing platform, or a similar messaging system that allows for the real-time, scalable, and reliable ingestion and distribution of data streams across various applications and data processing components.

Furthermore, the method may encompass the intake of the structured data into an object storage service through the utilization of a data integration connector such as a sink connector. In one embodiment, the sink connector used is an Amazon S3 Sink Connector.

The method may furthermore include implementing an event-driven serverless compute, where the event-driven serverless compute is triggered automatically when any new data is ingested to the object storage service, and where the event-driven serverless compute reads the JSON data, converts it to transformed data, and writes the transformed data to a distributed data store. The method may in addition include creating an Extract, Transform, Load (ETL) job, where the ETL job reads the data, further transforms the data, and writes it back into the distributed data store as ETL transformed data. The method may moreover include sending the ETL transformed data to an LLM API in batches to create inference results, where the batches are queued to manage the rate limits. The method may also include storing the inference results in cache storage. The method may furthermore include implementing an API gateway for secure access to inference results. Other embodiments of this aspect include corresponding computer systems, apparatus, and computer programs recorded on one or more computer storage devices, each configured to perform the actions of the methods.

The described implementations may also include one or more of the following features. A method where the ETL is triggered whenever the CSV transformed data is added to the distributed data store. A method where the distributed data store further may include a cloud storage container. A method where the object storage service further may include a multi-vendor data lake. Method where cache storage is used for repeated calls to the API gateway. A method where the stream product further may include an open-source distributed event streaming platform. The method may include initiating additional Lambda functions if required to retrieve results from cache and provide them to the end user. The method may also include maintaining two files for an API endpoint, where only one remains active at any given time. Implementations of the described techniques may include hardware, a method or process, or a computer tangible medium.

BRIEF DESCRIPTION OF THE DRAWINGS

Certain features are illustrated as examples in the accompanying drawings and should not be considered as limitations. In these drawings, identical numbers indicate corresponding elements.

DETAILED DESCRIPTION

The following descriptions of various embodiments refer to the accompanying drawings identified above. These drawings depict ways to implement the aspects described. However, it should be understood that other embodiments can be employed, and modifications in structure and function are permissible without veering away from the scope outlined in this document. The terminology and phrasing used in this document are meant for descriptive purposes and should not be seen as restrictive. Instead, every term is intended to be interpreted in its broadest sense and connotation. Words like "including" and "comprising," along with their derivatives, are meant to cover not only the listed items but also their equivalents and additional items, expanding their scope and inclusivity.

Figure 1:
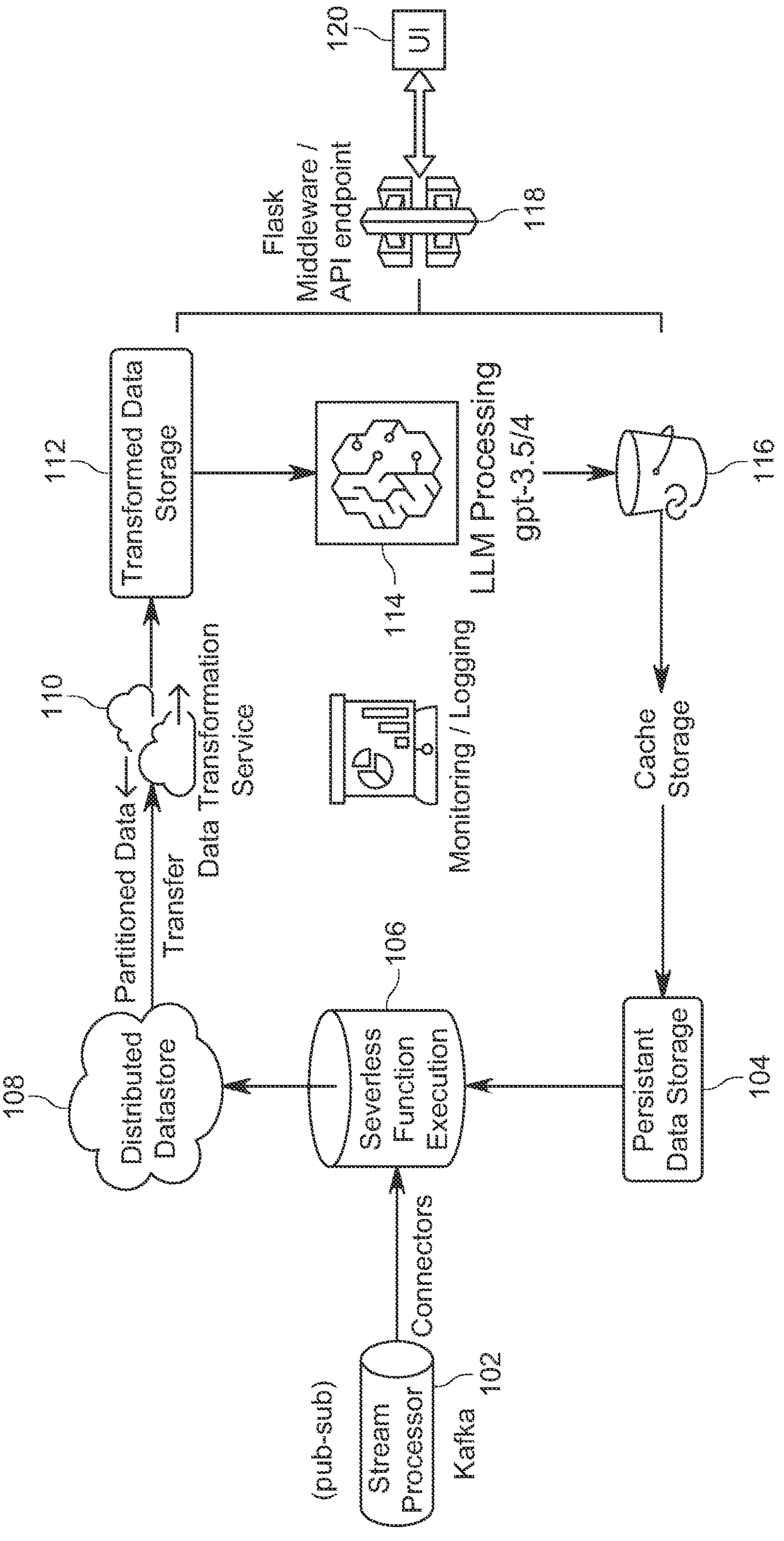
FIG. 1 illustrates a network environment of a network state data processing platform according to an embodiment of the present disclosure.

By way of example, FIG. 1 illustrates a network environment 100 of a network state data processing platform according to an embodiment of the present disclosure. Stream producer 102 is responsible for the generation and transmission of data to a designated stream or topic within the stream processing system. This data, which may take the form of events, messages, or records, is crucial for downstream applications' real-time processing and analysis.

Additionally, stream producer 102 is initiated for handling acknowledgments, enabling reliable message delivery, and can be equipped to manage various error scenarios that may arise during data transmissions. Stream producer 102 can efficiently manage high volumes of data and distribute it to multiple consumers.

According to an embodiment, producers specify the target partition for each message, thereby ensuring even distribution and parallelism. Additionally, the stream producer can address serialization requirements to efficiently encode data for storage and transmission. According to an embodiment, stream producer 102 continuously ingests, processes, and analyzes data in real-time, ensuring efficient handling of large volumes of streaming data. As data flows through the stream processor, it can be enriched and transformed before being forwarded to a serverless function 104.

Next, by utilizing event-driven architecture, serverless function 104 is triggered upon receiving data from the stream producer 102. This ensures optimal resource utilization as the function executes only when needed, scaling automatically to accommodate varying data volumes. Serverless function 104 is equipped with pre-defined logic to further process and format the data, preparing it for storage. It can be appreciated that the serverless function is configured to be executed in response to predefined triggers, without the need for provisioning or managing servers. When a trigger occurs, the serverless event-driven compute dynamically allocates the necessary resources and executes the function.

Upon execution completion, the processed data can be seamlessly written to a distributed data store 106. Distributed data store 106 can be a scalable object storage service such as Amazon S3, or another service with high availability, fault tolerance, and scalability, ensures that data is securely stored, easily retrievable, and ready for subsequent analysis and processing. This integration of stream processor, serverless function, and distributed data store creates a robust, efficient, and scalable data processing pipeline to implement the novel processes described herein. Next, a series of transformational steps occur, as discussed in detail below with regard to FIG. 5.

According to an embodiment, in a series of steps, the telemetry data is first cleaned by removing any NaN values. Next, specific indices are set for both telemetry and inventory data. These indices are essential for subsequent joining operations. By setting appropriate indices, telemetry and inventory data are joined in a manner which provides a more comprehensive dataset that includes both dynamic telemetry data and static inventory details. According to a further embodiment, the 'hash' attributes is dropped. Other unnecessary attributes may also be dropped at this stage.

According to an embodiment, a 'starttime' attribute is converted from a numerical representation to a human-readable timestamp. Next, a bandwidth utilization is computed based on the 'sum' and 'count' attributes. According to an embodiment, this calculation represents the average bandwidth utilization in Mbps, normalized by the 'totalmaxspeed'.

Next, a categorization of bandwidth utilization is performed. In one embodiment, utilization levels are divided into three categories: 'well utilized', 'moderately utilized', and 'under-utilized'. This categorization can provide a higher-level insight into how effectively the network resources are being used.

According to an embodiment, the 'slidingwindowsize' attribute is transformed into an understandable format, representing the window size in hours or minutes. This conversion allows for better understanding and potential further time-series analysis.

Next, the processed data is reset to a default index and can be exported to CSV format. CSV is a widely-accepted and easily readable data format that can be readily consumed by various tools and platforms. The processed data is subsequently stored in a dedicated repository referred to transformed data storage 112. This data is then primed for further processing through an LLM (Large Language Model) processing unit 114, and cached in "cache storage 118" for expedited access.

To facilitate user interaction and access to this data, a user interface labeled as "user interface 120" is provided. This interface seamlessly connects with a Flask middleware or an API endpoint 118." This middleware/API endpoint serves as a gateway, enabling users to retrieve results from the cache, as elaborated upon below.

Figure 2:
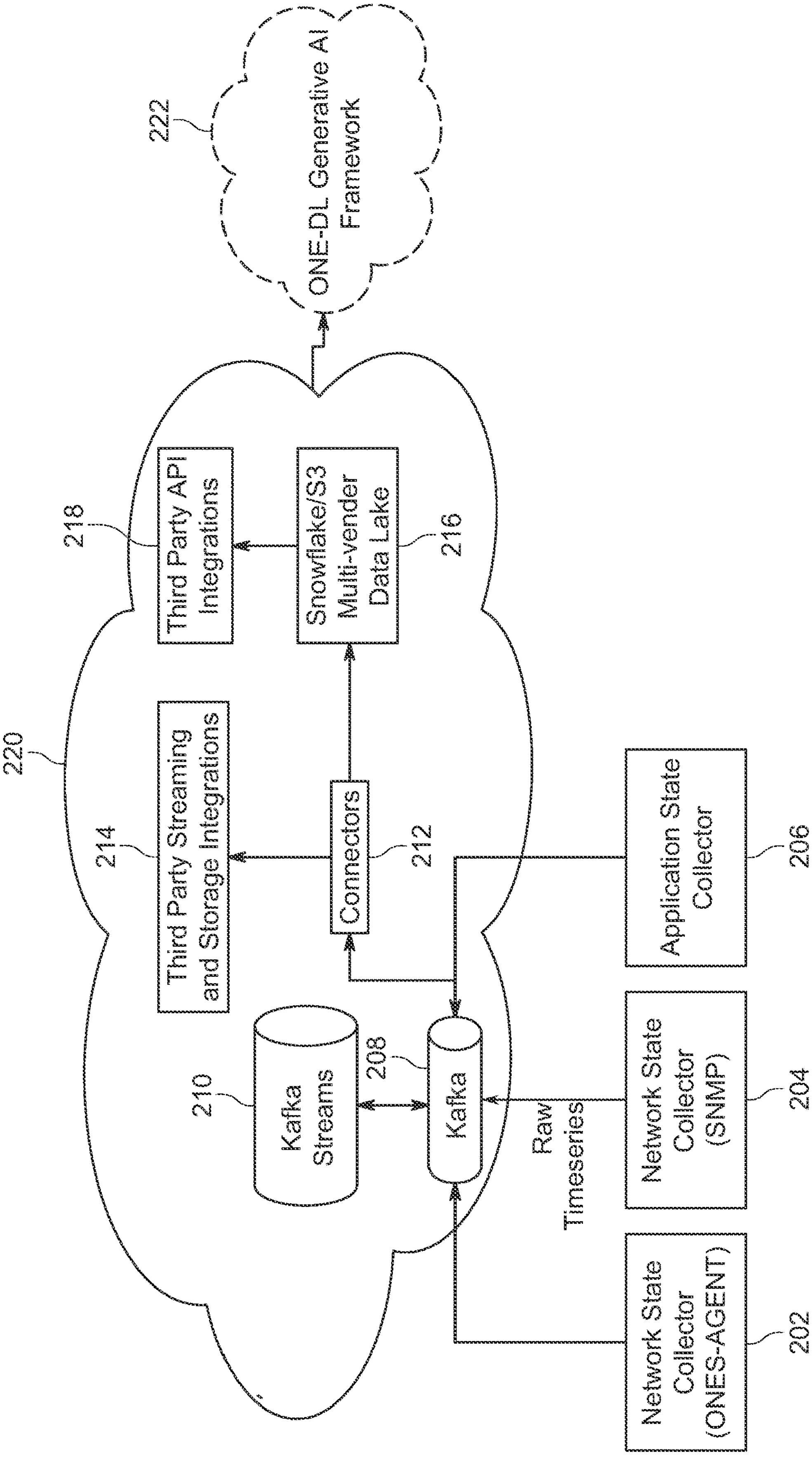
FIG. 2 is an implementation of a process architecture according to an embodiment of the present disclosure.

By way of example, FIG. 2 is an implementation of a process architecture according to an embodiment of the present disclosure. A stream producer 208 is initiated to function as a central conduit for the ingestion of real-time data on network state telemetry, specifically deriving data from network state collectors 202 and 204 and application state collector 206. In this configuration, the collectors 212 are initiated to acquire metrics and logs and to offer insights into system operational status. Kafka element 208 is responsible the facilitation of data flow through pre-defined connectors and Streams, thus enabling an array of data manipulations, including filtering, transformation, and enrichment.

Streams 210 are tasked with real-time data processing, designed to handle data transformation requirements. The ecosystem seamlessly interfaces with external systems, enabling the real time flow of processed data to specialized analytics, reporting, and machine learning tools, as described in FIGS. 3-5.

In this defined architecture, connectors 212 are configured to ensure data is rendered into precise formats and structures, optimized for downstream processing and analyses. One or more connectors 212 acts as a bridge between the stream producer 208 and the data Snowflake or S3 Multi-vendor data lake 216, ensuring that data is reliably and efficiently transmitted from the source to the destination. This can include using a sink connector as a bridge between stream producer 208 and Multi-vendor data lake 216.

In one embodiment, data lake 206 comprises a cloud-agnostic database system, originating from both on-premise and cloud sources, wherein it organizes and stores data in tabular formats that are readily consumed by observability applications. AI/ML applications can directly access this data, enabling them to derive intricate patterns and insights, which are instrumental for tasks like alert generation, predictive analytics, forecasting, and automated troubleshooting.

According to an embodiment, data ingestion is handled by a publish-subscribe messaging system, which consumes the bandwidth telemetry data published to a Kafka topic at the producer level. The data can then be encapsulated as JSON arrays and be published in real time. This type of architecture offers a robust and scalable platform for real-time data streaming, enabling the smooth ingestion of large data volumes.

Figure 3:
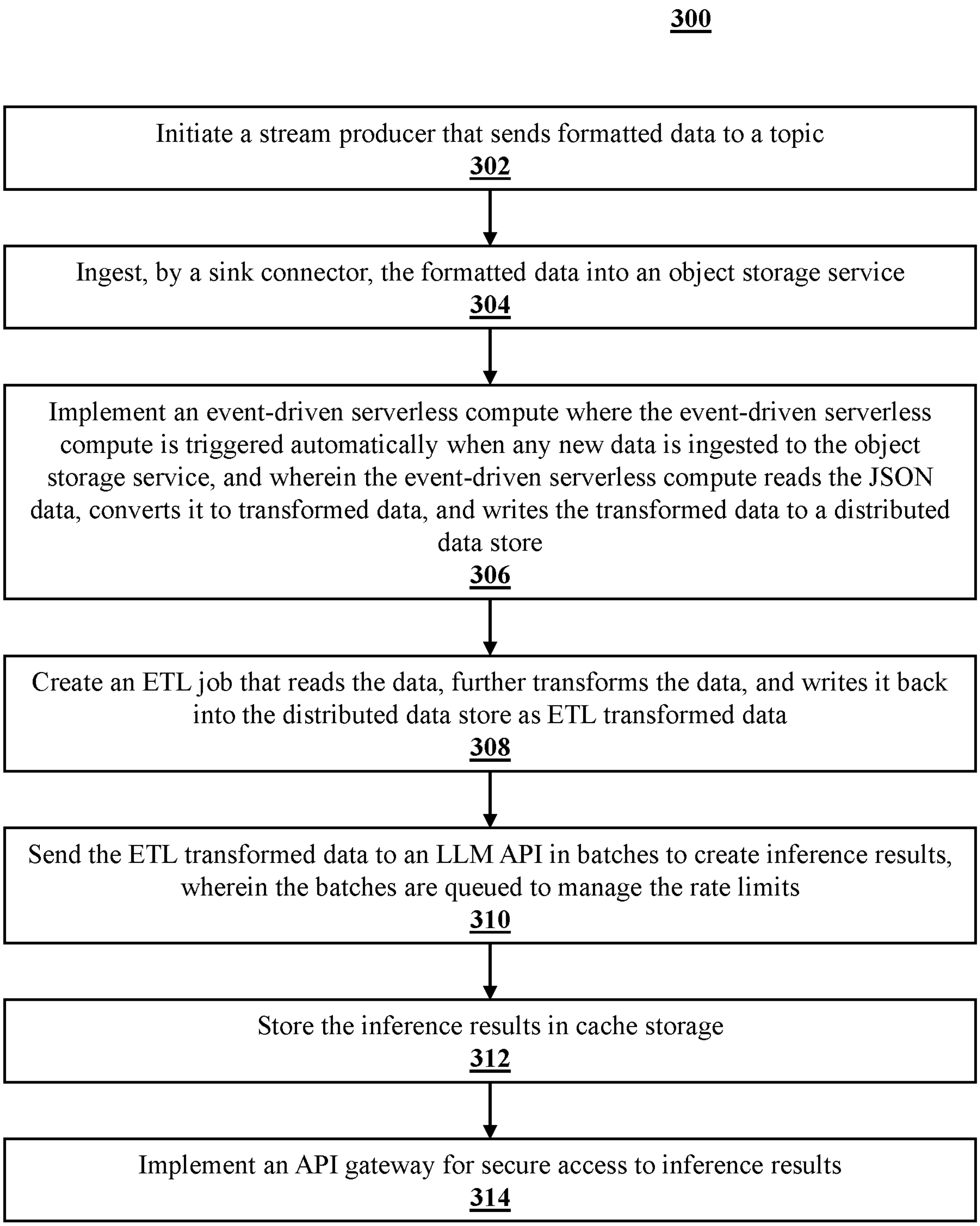
FIG. 3 is a flowchart of a process of creating a generative AI framework on network state telemetry.

By way of example, FIG. 3 is a flowchart of a process 300 of creating a generative AI framework on network state telemetry. As shown in FIG. 3, process 300 may include initiating a stream producer that sends formatted data to a topic (block 302). For instance, the stream producer might be Apache Pulsar, Amazon Kinesis, or Apache Kafka, sending formatted data to a topic, as previously explained. Using a stream producer offers several including the efficient and continuous transmission of data, and scalability by allowing network systems to handle growing data volumes by distributing the load across multiple servers or clusters. According to an embodiment, Publish/Subscribe (pub sub) Consumers are utilized consume the bandwidth telemetry data published to a Kafka topic at the producer level. According to an embodiment ingested data is encapsulated as JSON arrays and is published in real time. It can be appreciated that this type of data ingestion offers a robust and scalable platform for real-time data streaming, enabling the smooth ingestion of large data volumes.

Utilizing sink connector object store, the ingested data is then transferred to Amazon S3. This sink connector acts as a bridge between the Consumers and the object storage, ensuring that data is reliably and efficiently transmitted from the source to the destination. The integration between pub sub and object store provides data integrity without significant loss of information.

As also shown in FIG. 3, process 300 may include ingesting, by a sink connector, the formatted data into an object storage service (block 304). Such an integration between pub sub and object store data provides integrity without significant loss of information. Object storage can be implemented through Amazon S3, as well as alternative solutions like Google Cloud Storage, Microsoft Azure Blob Storage, and IBM Cloud Object Storage. For example, device may ingest, by a Pub Sub native object store sink connector, the formatted data into Amazon S3, as described above. According to an embodiment, S3 serves as the sink for the data consumed by Kafka, where it is stored in a structured and organized manner as and when the data is written to the s3 bucket in batches.

As further shown in FIG. 3, process 300 may include processing and transformation steps by implementing an event-driven serverless compute configured to be triggered automatically when any new data is ingested to the object storage service (block 306). According to an embodiment, the event-driven serverless compute reads the data in its native format, converts it to transformed data, and writes the transformed data to a distributed data store. According to an embodiment of the disclosure, the method may implement an event-driven serverless compute by implementing an AWS Lambda function, where the event-driven serverless compute is triggered automatically when any new data is ingested to the object storage service, and where the event-driven serverless compute reads the JSON data, converts it to transformed data, where transformed data is in the CSV format (CSV transformed data), and writes the CSV transformed data to a distributed data store, as described above.

It can be appreciated that utilizing a serverless architecture as described herein eliminates the need for manual intervention, thus enabling seamless and efficient execution of code in reaction to the stream producer. Other embodiments may implement an event-driver serverless compute by using Google Cloud Functions, Microsoft Azure Functions, and IBM Cloud Functions, among others. The processing and transformation phase is a crucial step in preparing the raw data for modeling. This phase includes operations such as data cleaning, transformation, joining, and computation. Such an architecture allows for scalable execution and separation of concerns, where a dedicated machine learning service focuses only on training.

Once preprocessing and transformation are completed, the prepared data is written back to object storage. Storing the transformed data in object storage ensures that it's accessible to other components of the pipeline, such as SageMaker for training and inference. As also shown in FIG. 3, process 300 may include creating an ETL job, where the ETL job reads the data, further transforms the data, and writes it back into the distributed data store as ETL transformed data (block 308). For example, device may create a glue job, where the glue job reads the data, further transforms the data, and writes it back into the distributed data store as ETL transformed data, as described above. As further shown in FIG. 3, process 300 may include sending the ETL transformed data to an LLM API in batches to create inference results, where the batches are queued to manage the rate limits (block 310).

Model training is an important part of the data pipeline that leverages the preprocessing and transformation stages to prepare and optimize the model for inference. According to an embodiment, model training encompasses two significant phases: the utilization of generative AI capabilities to pandas (by using a tool such as PandasAI), and data analysis and manipulation by, for example, LangChain for domain-specific applications. The training process has been designed to be incremental and decoupled from the inference, providing scalability and adaptability.

Figure 4:
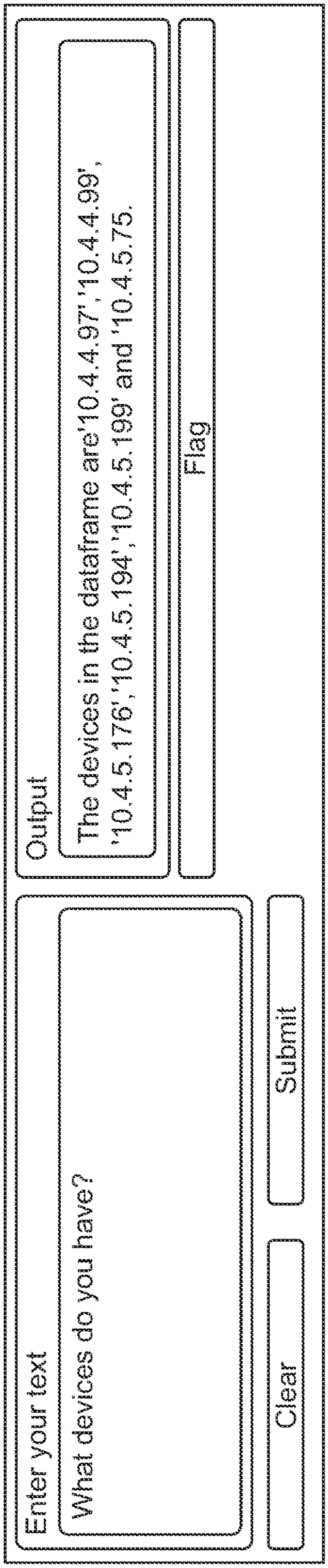
FIG. 4 discloses a response from Agent.

The LangChain platform can be utilized to execute the method's specific steps for domain-specific applications. This step includes a main model training process. In one embodiment, Dask is utilized to handle the parallelization of reading data, which can be of a considerable size, ranging into gigabytes or terabytes, ensuring both speed and efficiency. The data is then compiled into a unified pandas DataFrame, prepared for interaction with the LangChain's Pandas Dataframe agent. Utilizing such a modular architecture facilitates customization, allowing the creation of an agent that can engage with the data in English, as shown in FIG. 4. It transforms natural language queries into pandas commands, delivering human-like responses. According to an embodiment, training data is loaded into the agent.

By separating the training and inference processes in the methods described herein, the system gains flexibility. This separation means that changes or improvements to the training process can be made without affecting the existing inference functionality. It also facilitates parallel development and testing. The architecture supports scalability, allowing for the handling of ever-increasing data sizes and complexity. The system can grow with the needs of the organization without significant re-engineering.

For example, the process may include sending the ETL transformed data to an LLM API in batches to create inference results, where the batches are queued to manage the rate limits, as described above. As also shown in FIG. 3, process 300 may include storing the inference results in cache storage (block 312). Caching plays a crucial role in enhancing data retrieval processes, significantly improving application performance. By storing frequently accessed data in memory, which is much faster than traditional disk storage, applications can retrieve data at accelerated speeds, ensuring a smooth and responsive user experience. This capability is particularly beneficial during high-traffic periods, as cache supports stable performance and prevents slowdowns. Furthermore, by reducing the need for redundant API calls to the Lower Layer Mechanism (LLM), caching not only optimizes speed but also contributes to cost-efficiency.

In addition to augmenting speed and cost-effectiveness, caching alleviates the workload on backend databases. This is achieved by reducing the number of direct data requests, minimizing the risk of database slowdowns or crashes during peak usage times. Caching in this manner is particularly advantageous for popular data profiles or items, preventing the overexertion of database resources. With the capacity to handle a multitude of data actions simultaneously, a well-implemented cache system ensures consistent, reliable performance, enhancing the overall efficiency and responsiveness of applications.

Once the training data has been loaded into the Agent, it is ready to be deployed. According to an embodiment, an Amazon Sagemaker Notebook Instance is used to deploy the endpoint. The user query is routed to the API endpoint to be run on the Agent. The generated response is then returned back to the user.

It can be appreciated that by using such an approach, the model showcases a commendable precision in its response generation. The model proficiently delivers precise answers for queries related to general knowledge. The model has successfully addressed prior challenges like extended training durations and delivering partial or erroneous responses.

As further shown in FIG. 3, process 300 may include implementing an API gateway for secure access to inference results (block 314). For example, the process may implement an API gateway for secure access to inference results, as described above. Process 300 may include additional implementations, such as any single implementation or any combination of implementations described below and/or in connection with one or more other processes described elsewhere herein. In a first implementation, the ETL is triggered whenever the transformed data is added to the distributed data store. In one embodiment, transformed data comprises a file in CSV file format.

In a second implementation, alone or in combination with the first implementation, the distributed data store further may include a cloud storage container.

In a third implementation, alone or in combination with the first and second implementation, the object storage service further may include a multi-vendor data lake.

In a fourth implementation, alone or in combination with one or more of the first through third implementations, cache storage is used for repeated calls to the API gateway.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

FIG. 4 discloses a response from the Agent. According to an embodiment of the present disclosure, to mitigate the recurring need to access the complete dataset, a double buffering method is employed. This approach entails maintaining two files for an API endpoint, though only one remains active at any given time. Given the periodic receival of fresh data, one file operates using the preceding data. Concurrently, the updated dataset—comprising both old and new data—is processed in the second file. While the Agent prepares to accommodate the new data, incoming queries are directed to the initial file. Once the Agent has assimilated the new data, query routing is switched to the second file. The previously secondary file now operates on the new dataset, and the cycle continues. This mechanism efficiently sidesteps the issue of constant large-scale data retrieval.

Figure 5:
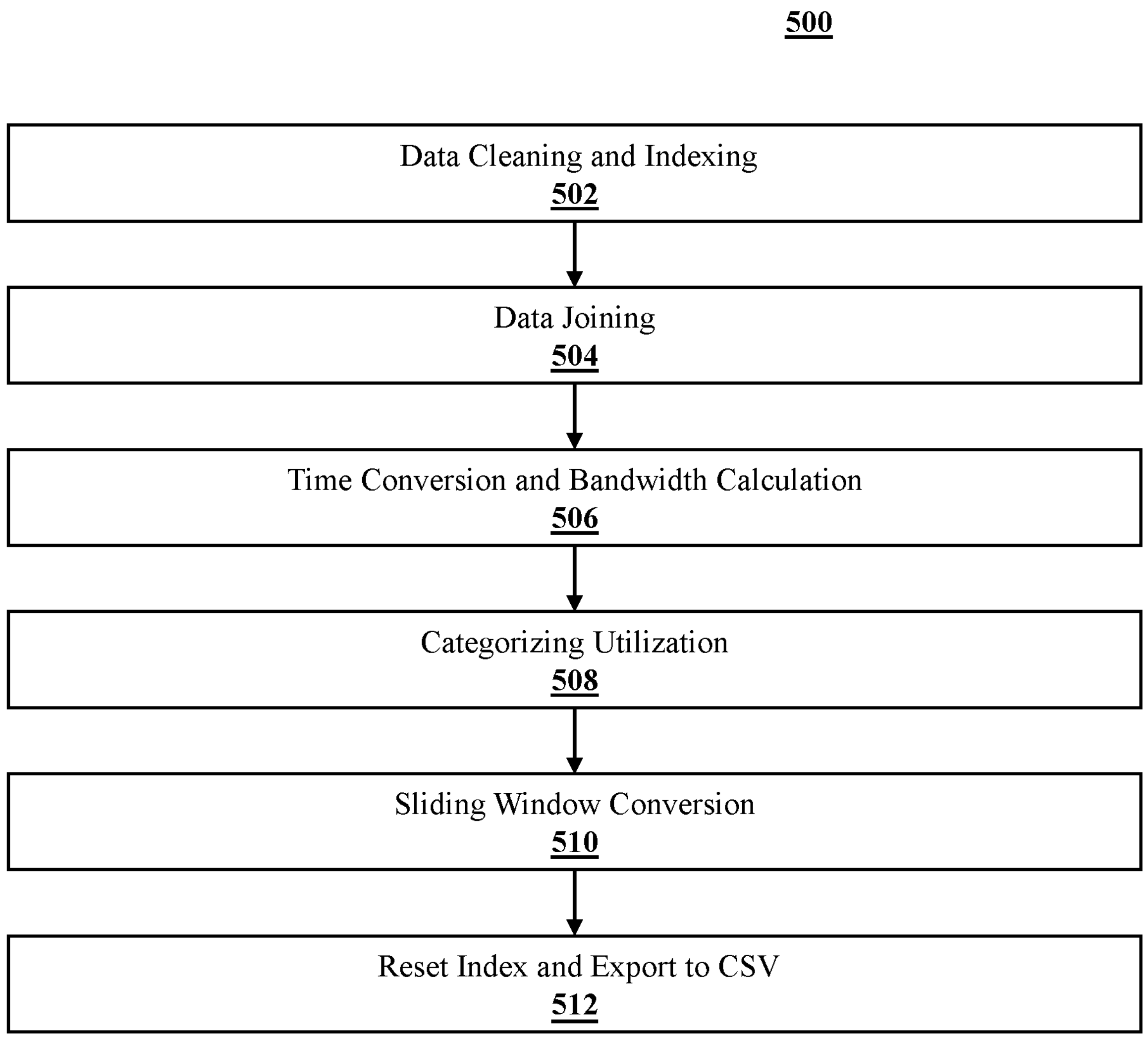
FIG. 5 is a flowchart of an example process 500 according to an embodiment of the present disclosure.

FIG. 5 is a flowchart of an example process 500. In some implementations, one or more process blocks of FIG. 5 may be performed by a device.

As shown in FIG. 5, process 500 may include Data cleaning and Indexing (block 502). For example, telemetry data is cleaned by removing any NaN values, and specific indices are set for both telemetry and inventory data. These indices are essential for subsequent joining operations, as described above. As also shown in FIG. 5, process 500 may include Data Joining (block 504). By setting appropriate indices, telemetry and inventory data are joined seamlessly. This joining provides a more comprehensive dataset that includes both dynamic telemetry data and static inventory details. Unnecessary attributes like 'hash' are also dropped As further shown in FIG. 5, process 500 may include Time Conversion and Bandwidth Calculation (block 506). For example, the 'starttime' is converted from a numerical representation to a human-readable timestamp. The bandwidth utilization is computed based on the 'sum' and 'count' attributes. This calculation represents the average bandwidth utilization in Mbps, normalized by the 'totalmaxspeed'. As also shown in FIG. 5, process 500 may include Categorizing Utilization (block 508). According to an embodiment, a categorization of bandwidth utilization is performed. Utilization levels are divided into three categories: 'well utilized', 'moderately utilized', and 'under-utilized'. This categorization provides a higher-level insight into how effectively the network resources are being used. As further shown in FIG. 5, process 500 may include Sliding Window Conversion (block 510). The 'slidingwindowsize' attribute is transformed into an understandable format, representing the window size in hours or minutes. This conversion allows for better understanding and potential further time-series analysis. As also shown in FIG. 5, process 500 may include Reset Index and Export to CSV: (block 512). Here, the processed data is reset to a default index and exported to CSV format. For example, device may reset index and export to csv:, as described above.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. What has been described and illustrated herein is an example along with some of its variations. The terms, descriptions and figures used herein are set forth by way of illustration only and are not meant as limitations.

While the detailed description above has presented novel features in relation to various embodiments, it is important to acknowledge that there is room for flexibility, including omissions, substitutions, and modifications in the design and specifics of the devices or algorithms illustrated, all while remaining consistent with the essence of this disclosure. It should be noted that certain embodiments discussed herein can be manifested in various configurations, some of which may not encompass all the features and advantages expounded in this description, as certain features can be implemented independently of others. The scope of the embodiments disclosed here is defined by the appended claims, rather than the preceding exposition. All alterations falling within the meaning and range of equivalence of the claims are to be encompassed within their ambit.

What is claimed is:

1. A method, comprising:

initiating a stream producer that sends formatted data to a topic;

ingesting, by a sink connector, the formatted data into an object storage service;

implementing an event-driven serverless compute, wherein the event-driven serverless compute is triggered automatically when any new data is ingested to the object storage service, and wherein the event-driven serverless compute reads JavaScript Object Notation (JSON) data, converts it to transformed data, and writes the transformed data to a distributed data store;

creating an Extract, Transform, Load (ETL) job, wherein the ETL job reads the data, further transforms the data, and writes it back into the distributed data store as ETL transformed data;

sending the ETL transformed data to a Large Language Model (LLM) Application Programming Interface (API) in batches to create inference results, wherein the batches are queued to manage rate limits;

storing the inference results in cache storage; implementing an API gateway for secure access to inference results;

executing a double buffering process for an API endpoint that routes incoming queries to an Artificial Intelligence (AI) Agent by:

serving data from a first, active file associated with the API endpoint to answer the incoming queries;

concurrently processing an updated dataset, comprising both old and new data, to create a second, inactive file while the incoming queries are directed to the first, active file; and upon completion of the processing, switching the API endpoint to designate the second file as the new active file to provide seamless data updates; and utilizing the cache storage for repeated calls to the API gateway to access the inference results.

2. The method of claim 1, wherein the ETL job is triggered whenever the transformed data is added to the distributed data store.

3. The method of claim 2, wherein the distributed data store further comprises a cloud storage container.

4. The method of claim 1, wherein the object storage service further comprises a Multi-vendor data lake.

5. The method of claim 1, wherein the stream producer further comprises an open-source distributed event streaming platform.

6. The method of claim 1, further comprising initiating additional functions if required to retrieve results from cache and provide them to the end user.

7. The method of claim 1, wherein while the Agent prepares to accommodate the new data, incoming queries are directed to the initial file.

8. A device comprising:

a storage device; and a processor executing program instructions stored in the storage device and being configured to:

initiate a stream producer that sends formatted data to a topic;

ingest, by a sink connector, the formatted data into an object storage service;

implement an event-driven serverless compute, wherein the event-driven serverless compute is triggered automatically when any new data is ingested to the object storage service, and wherein the event-driven serverless compute reads the JavaScript Object Notation (JSON) data, converts it to transformed data, and writes the transformed data to a distributed data store;

create an Extract, Transform, Load (ETL) job, wherein the ETL job reads the data, further transforms the data, and writes it back into the distributed data store as ETL transformed data;

send the ETL transformed data to a Large Language Model (LLM) Application Programming Interface (API) in batches to create inference results, wherein the batches are queued to manage rate limits;

store the inference results in cache storage; and implement an API gateway for secure access to inference results;

execute a double buffering process for an API endpoint that routes incoming queries to an Artificial Intelligence (AI) Agent by:

serving data from a first, active file associated with the API endpoint to answer the incoming queries;

concurrently processing an updated dataset, comprising both old and new data, to create a second, inactive file while the incoming queries are directed to the first, active file; and upon completion of the processing, switching the API endpoint to designate the second file as the new active file to provide seamless data updates; and utilize the cache storage for repeated calls to the API gateway to access the inference results.

9. The device of claim 8, wherein the ETL job is triggered whenever the transformed data is added to the distributed data store.

10. The device of claim 9, wherein the distributed data store further comprises a cloud storage container.

11. The device of claim 8, wherein the object storage service further comprises a Multi-vendor data lake.

12. The device of claim 8, wherein the stream producer further comprises an opensource distributed event streaming platform.

13. The device of claim 8, wherein the processor is further configured to:

initiate additional event-driven serverless computes if required to retrieve results from cache and provide them to the end user.

14. The device of claim 8, wherein the processor is further configured to:

maintain two files for an API endpoint, wherein only one remains active at any given time.

* * * * *